United States Patent [19]

Seki et al.

[11] Patent Number: 4,819,108

[45] Date of Patent: Apr. 4, 1989

[54] APPARATUS FOR POSITIONING MAGNETIC HEAD

[75] Inventors: Gen Seki; Seiichi Hayashi, both of Mito, Japan

[73] Assignee: Hitachi, Ltd., Tokyo, Japan

[21] Appl. No.: 178,884

[22] Filed: Apr. 5, 1988

Related U.S. Application Data

[63] Continuation of Ser. No. 724,768, Apr. 18, 1985, abandoned.

[30] Foreign Application Priority Data

Apr. 20, 1984 [JP] Japan ................................. 59-78539
Jan. 18, 1985 [JP] Japan ................................. 60-8063

[51] Int. Cl.$^4$ ............................ G11B 3/10; G11B 3/34; G11B 3/36
[52] U.S. Cl. .................................... 360/104; 360/105; 360/109
[58] Field of Search ....................... 360/104, 105, 109

[56] References Cited

U.S. PATENT DOCUMENTS

| | | | |
|---|---|---|---|
| 3,918,089 | 11/1975 | Kato et al. ............................. | 360/66 |
| 3,931,641 | 1/1976 | Watrous ................................. | 360/104 |
| 4,089,029 | 5/1978 | Castrodale et al. .................... | 360/99 |
| 4,150,407 | 4/1979 | Dijkstra ................................. | 360/106 |
| 4,151,573 | 4/1979 | Tandon et al. ......................... | 360/104 |
| 4,270,155 | 5/1981 | Bejerano ............................... | 360/109 |
| 4,306,260 | 12/1981 | Maeda et al. .......................... | 360/105 |
| 4,343,025 | 8/1982 | Kronfeld et al. ................. | 360/105 X |
| 4,349,851 | 9/1982 | Higashiyama et al. ......... | 360/104 X |
| 4,355,339 | 10/1982 | King et al. ............................ | 360/105 |
| 4,376,294 | 3/1983 | Meier et al. .......................... | 360/105 |
| 4,379,316 | 4/1983 | Krane ................................... | 360/105 |
| 4,400,750 | 8/1983 | Krane ............................. | 360/104 X |
| 4,445,155 | 4/1984 | Takahashi et al. .................... | 360/99 |
| 4,527,211 | 7/1985 | Grittman et al. ................ | 360/105 X |
| 4,549,239 | 10/1985 | Kawajiri .............................. | 360/105 |
| 4,571,648 | 2/1986 | Barski ................................. | 360/105 |

Primary Examiner—Stuart N. Hecker
Assistant Examiner—Alyssa H. Bowler
Attorney, Agent, or Firm—Antonelli, Terry & Wands

[57] ABSTRACT

A magnetic head positioning apparatus including a chassis, a driving device provided on the chassis, a guide member provided on the chassis, a carrier movably provided on the guide member, a first metallic head support mounted on the carrier and adapted to support a first magnetic head, and a second metallic head support mounted on the carrier and adapted to support a second magnetic head which is disposed to oppose the first magnetic head. A coupling member is formed on the first head support and directly connected to the driving device. By moving the coupling member by the operation of the driving device, the carrier is moved along the guide member through the first head support. Thus, it is possible for the magnetic head positioning apparatus to possess excellent resistance to environmental changes and to effect highly accurate positioning of the magnetic heads.

17 Claims, 5 Drawing Sheets

APPARATUS FOR POSITIONING MAGNETIC HEAD

This is a continuation application of Ser. No. 724,768, filed Apr. 18, 1985, now abandoned.

BACKGROUND OF THE INVENTION

The present invention relates to an apparatus for positioning magnetic heads for effecting recording and reproducing with respect to a flexible double-sided magnetic disk.

In, for example, Japanese Laid Open Patent Application 77028/1980, a typical conventional apparatus of the aforementioned type is proposed wherein one of the magnetic heads is directly secured to a carrier of a synthetic resin which is slidable on a guide shaft, with the other magnetic head being secured to an arm of a synthetic resin which is mounted on the carrier. A disadvantage of this proposed arrangement resides in the fact that changes occurring in the synthetic resin portions due to fluctuations in temperature and relative humidity or time unfavorably lower the degree of positioning accuracy of the magnetic heads. Such changes make it particularly easy for displacement to take place between the two opposed magnetic heads across a double-sided magnetic disk. Further, to respectively mount the magnetic heads on the carrier and the arm by employing thin metallic gimbals, it is necessary to respectively secure the gimbals to the carrier and the arm by an adhesive since the carrier and the arm are both made of a synthetic resin. However, this bonding between the gimbals and the carrier and the arm by the adhesive is easily affected by changes occurring in the adhesive due to fluctuations in temperature and relative humidity or with time and, disadvantageously, is unstable, so that it is difficult to effect highly accurate positioning of the magnetic heads.

In view of the above-described disadvantages of the prior art, it is an object of the present invention to provide a magnetic head positioning apparatus which is subjected to greatly reduced changes in essential portions with fluctuations in temperature and relative humidity or with time and, consequently, allows the magnetic heads to be highly accurately positioned.

To this end, the present invention provides a magnetic head positioning apparatus comprising a chassis, a driving device provided on the chassis, a guide member provided on the chassis, a carrier movably provided on the guide member, a first metallic head support mounted on the carrier and adapted to support a first magnetic head, a second metallic head support mounted on the carrier and adapted to support a second magnetic head which is disposed in opposition to the first magnetic head, and a coupling member formed on the first head support as well as directly connected to the driving device. The coupling member is moved by the driving device in such a manner so as to move the carrier along the guide member through the first head support.

The above and other objects, features and advantages of the present invention will become clear from the following description of the preferred embodiment thereof, taken in conjunction with the accompanying drawings.

BRIEF DESCRIPTION OF THE DRAWINGS

The accompanying drawings in combination show one embodiment of the present invention, in which.

DETAILED DESCRIPTION OF THE PREFERRED EMBODIMENT

Figure 1:
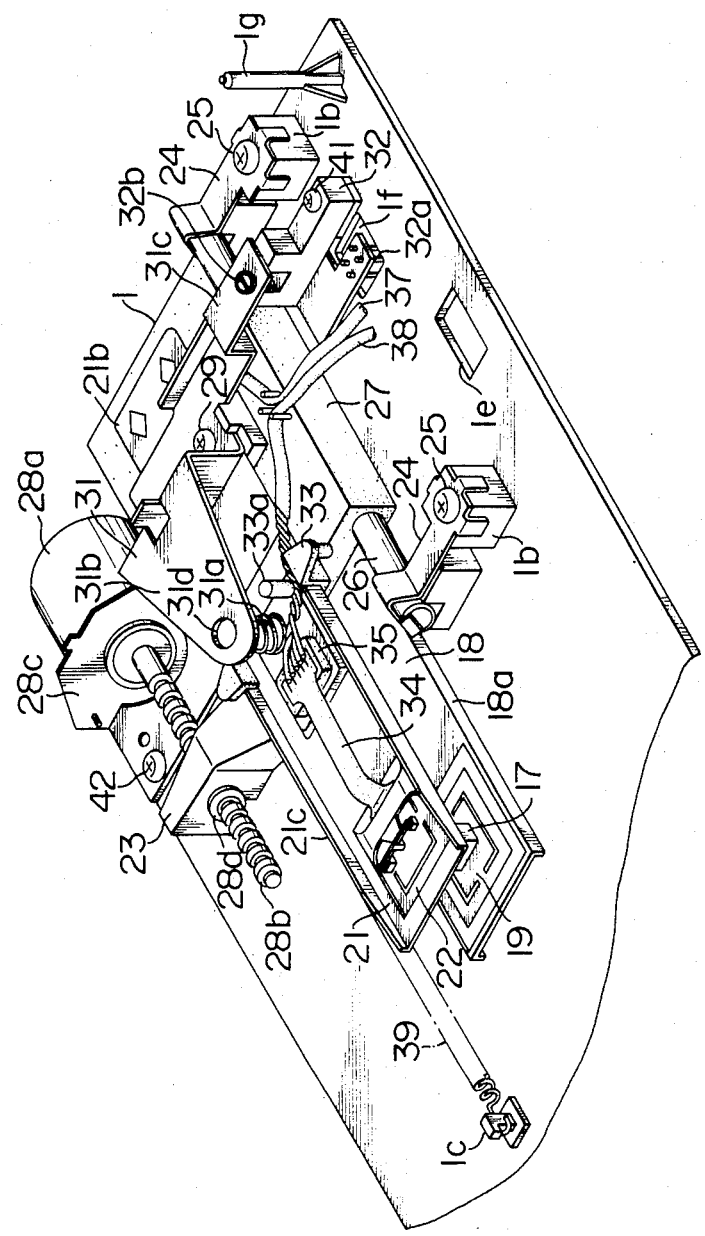
FIG. 1 is a perspective view of a portion of the embodiment of the present invention in an assembled state.
Figure 2:
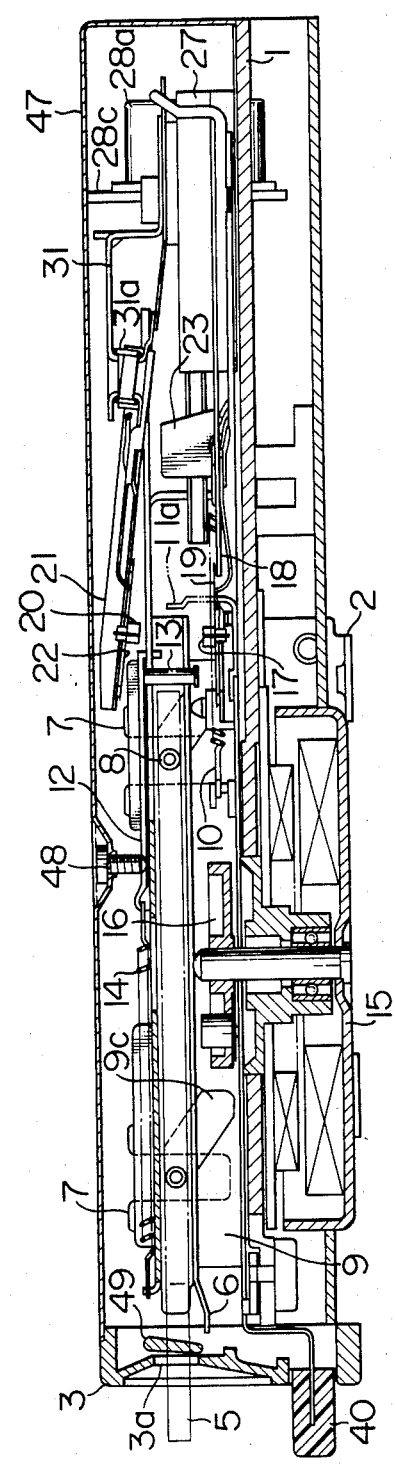
FIG. 2 is a sectional view of a portion of the embodiment of the present invention prior to insertion of a magnetic disk therein.
Figure 3:
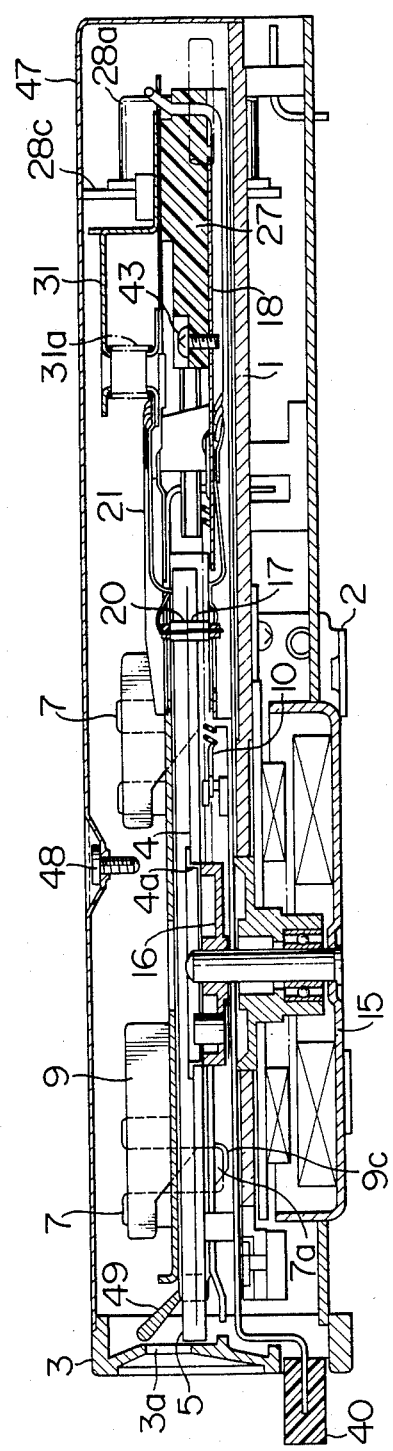
FIG. 3 is a sectional view of the portion of the embodiment shown in FIG. 2 after insertion of the magnetic disk therein.
Figure 4:
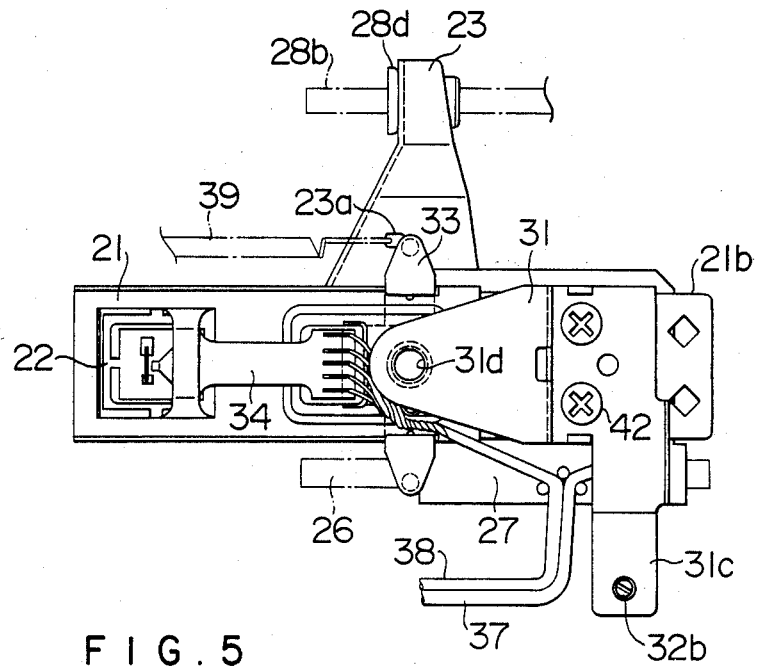
FIG. 4 is a plan view of a portion of the embodiment of the present invention in an assembled state.
Figure 5:
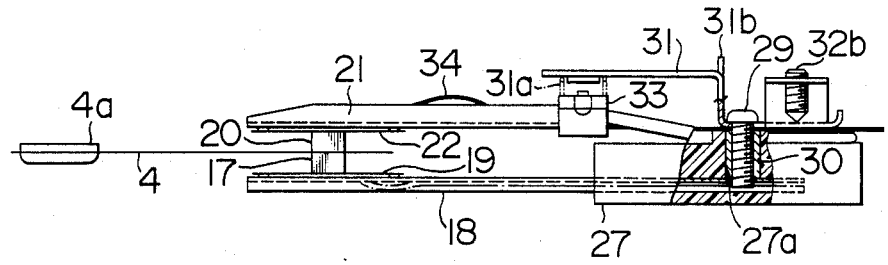
FIG. 5 is a side elevational view of the portion shown in FIG. 4 in an assembled state.
Figure 6:
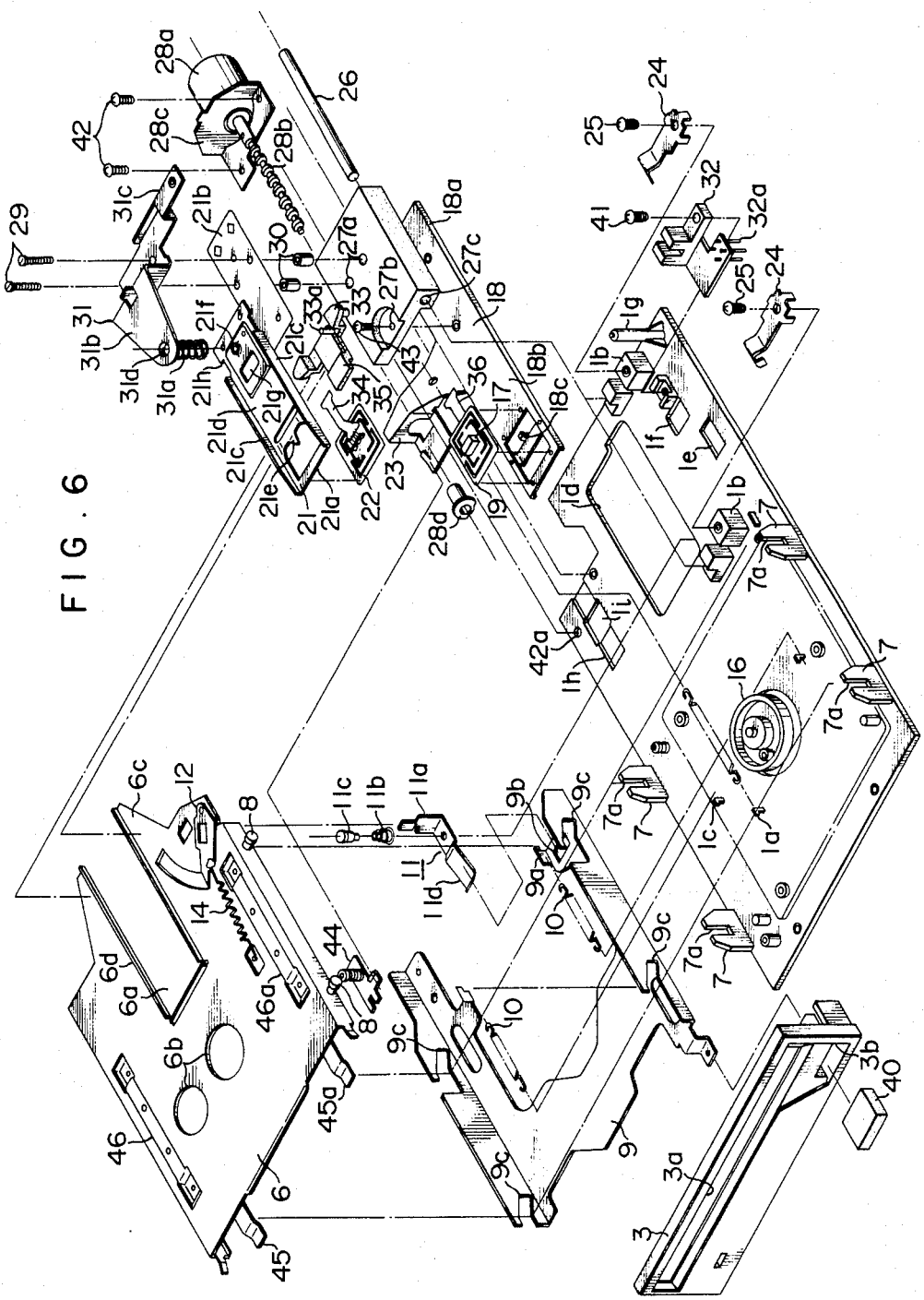
FIG. 6 is an exploded perspective view of the embodiment of the present invention.

One embodiment of the present invention will be described hereinunder with reference to the accompanying drawings.

In the drawings, a chassis 1 of a magnetic recording and reproducing apparatus is made from a steel sheet. A support plate 2 for mounting the magnetic recording and reproducing apparatus onto another device, such as a personal computer, is secured to the chassis 1 by fasteners such as, for example, screws or other fixing means. A front panel 3 is secured to the front side of the chassis 1 by fasteners such as, for example, screws or other fixing means. The front panel 3 is provided with an opening 3a for loading and unloading a cartridge 5 which houses a flexible double-sided magnetic disk 4.

A holder 6 made from a steel sheet is vertically movably supported by four support members 7 of a synthetic resin which are projected from the surface of the chassis 1 at its end portions, with the four support members 7 being respectively formed with guide grooves 7a, and the holder 6 being provided at side edges thereof with rollers 8 engageable with the corresponding guide grooves 7a.

An eject lever 9 made from a steel sheet is movably mounted on the chassis 1. Each of coiled springs 10 has one of its ends retained by one of mounting pieces 1a projecting from the surface of the chassis 1 and the other end thereof retained by one of mounting pieces 9a which is formed on the eject lever 9.

A resilient retainer 11 includes an L-shaped lever 11a, a coiled spring 11b and a mounting pin 11c which is used to mount the coiled spring 11b and the lever 11a to the chassis 1. The arrangement is such that, when the eject lever 9 is moved rearwardly and a retainer opening 9b provided in the eject lever 9 is engaged with a retaining bent portion 11d formed on the lever 11a, this engagement state is maintained by the resilient force of the coiled spring 11b. When the lever 11a is pivoted against the resilient force of the coiled spring 11b, the above-described engagement is released, and the eject lever 9 is moved forwardly by the action of the coiled springs 10 so as to be restored to its previous state.

As the cartridge 5 is inserted into the holder 6 from the opening 3a, a retainer pin 13, provided on a lever 12 pivotally supported on the holder 6, is planarly moved against the resilient force of a tension spring 14 in such a manner that the retainer pin 13 opens a shutter (not shown) of the cartridge 5. As the cartridge 5 is further forced into the holder 6, the cartridge 5 abuts against the lever 11a, causing it to pivot about the retainer pin 13. Consequently, the engagement between the eject lever 9 and the lever 11a is released, and the eject lever 9 is moved forwardly by the action of the coiled springs 10.

The eject lever 9 includes guide grooves 9c formed in bent portions at both ends. The guide grooves 9c allow the corresponding rollers 8 provided on the holder 6 to lower along the respective guide grooves 7a when the eject lever 9 is moved forwardly. When the rollers 8 lower along the respective guide grooves 7a, the holder 6 lowers correspondingly, whereby the hub 4a of the magnetic disk 4 is fitted on a hub holder 16 of a magnetic disk driving device 15 constituted by a D. D. M which is secured to the chassis 1.

A first magnetic head 17 which effects recording and reproducing with respect to the magnetic disk 4 is mounted on a first head support 18 made from a sheet metal, e.g., a stainless steel sheet, with a thickness of 0.3 to 0.5 mm through gimbals 19 made from a sheet metal sheet, e.g., a stainless steel sheet, which a thickness of 0.05 to 0.08 mm. A second magnetic head 20 effects recording and reproducing with respect to the side of the magnetic disk 4 which is opposite to the side thereof on which the first magnetic head 17 effects recording and reproducing operations. The second magnetic head 20 is mounted on a second head support 21 made from a sheet metal, e.g., a stainless steel sheet, with a thickness of 0.3 to 0.5 mm through gimbals 22 made from a sheet metal, e.g., a stainless steel sheet, with a thickness of 0.05 to 0.08 mm. The gimbals 19 and 22 are respectively welded to the first and second head supports 18 and 21.

The first head support 18 is integrally formed with a coupling member 23 which projects to a large degree from the side of the support 18. In accordance with this embodiment, the first head support 18 and the coupling member 23 are formed by blanking a single stainless steel sheet, but the formation thereof is not necessarily limitative thereto. It is possible to form the first head support 18 and the coupling member 23 as separate members and to weld the members together when the apparatus is assembled.

Two guide members 26, each made from a metal rod, are mounted in parallel on the chassis 1 by employing mounting pieces 1b which project from the surface of the chassis 1 and mounting members 24 each made of a leaf spring material as well as mounting screws 25.

A carrier 27 made of a synthetic resin is movably mounted on the guide members 26, with the first and second head supports 18 and 31 being mounted on the carrier 27 in such a manner so as to clamp the carrier 27. The respective mounting positions of the head supports 18 and 21 are set such that the first and second magnetic heads 17 and 20 are disposed in opposition to each other.

The second head support 21 includes a member 21a supporting the second magnetic head 20, and a member 21b including a metal member which is smaller in thickness than the member 21a, so that the member 21a is held so as to be upwardly swingable. The members 21a and 21b are integrated with each other by caulking.

The second head support 21 includes bent pieces 21c formed at both its side edges. The bent pieces 21c project outwardly from the surface 21d of the second head support 21 which is opposite to the surface thereof for mounting the second magnetic head 20 and extend in the longitudinal direction of the second head support 21.

The chassis 1 is provided thereon with a driving device 28 for positioning the first and second magnetic heads 17 and 20. The driving device 28 includes a motor 28a constituted by, e.g., a stepping motor, a screw 28b rotated both forwardly and backwardly by the operation of the motor 28a, and a mounting plate 28c employed to secure the motor 28a to the chassis 1.

The screw 28b and the coupling member 23 are directly connected together by a screw nut 28d in such a manner that the coupling member 23 moves on the screw 28b as it rotates.

The first head support 18 includes bent pieces 18a formed at both its side edges. The bent pieces 18a project outwardly from the surface of the first head support 18 opposite to the surface 18b for mounting the first magnetic head 17 and extend in the longitudinal direction of the first head support 18.

The first head support 18, the carrier 27 and the second head support 21 are integrated together by fastening means such as, for example, screws 29. The carrier 27 is provided with through-holes 27a for receiving the respective screws 29. The through-holes 27a are respectively provided therein with metallic spaces or bushings 30 by insert molding or press fitting.

A spring device 31 is adapted to press the second head support 21 in such a direction that the second magnetic head 20 is pressed against the first magnetic head 17. It is necessary for the spring device 31 to include, at least, a coiled spring 31a and a mounting member 31b made from a steel sheet for mounting the coiled spring 31a. The mounting member 31b is secured on the carrier fitting member 21b of the second head support by fasteners such as, for example, screws 29. The mounting member 31b is integrally formed with a member 31c for mounting an interlock adjusting member 32b of a position sensor 32. The position sensor 32 defines and senses the initial position of the carrier 27.

The second head support 21 is provided with an arm 33 employed to upwardly swing the second head support 21, and a terminal plate 35 for effecting electrical connection of a flexible cord 34 which is connected to the second magnetic head 20. The arm 33 and the terminal plate 35 are integrally molded from a synthetic resin having excellent electrical insulating properties.

The respective mounting positions of the arm 33 and the coiled spring 31a of the spring device 31 are located in a substantially straight line extending in a direction orthogonal to the longitudinal direction of the second head support 21.

A flexible cord 36 which is connected to the first magnetic head 17 is electrically connected with a head cord 37, while the flexible cord 34 connected to the second magnetic head 20 is electrically connected with a head cord 38.

A tension spring 39 has one end thereof retained by a notch 23a formed in the coupling member 23 and the other end thereof retained by a mounting piece 1c projecting from the surface of the chassis 1. Thus, both the coupling member 23 and the first head support 18 are constantly pulled in a predetermined direction by the action of the tension spring 39.

The front panel 3 is provided with an opening 3b through which a synthetic resin knob 40 for actuating the eject lever 9 is inserted and retracted. The knob 40 is secured to the front end of the eject lever 9 by a fastener such as, for example, screw or other fixing means.

The position sensor 32 is secured to the chassis 1 by a screw 41. The mounting plate 28c of the driving device 28 is secured to the chassis 1 by screws 42 which are respectively received by screw bores 42a.

The first head support 18 is fastened to the carrier 27 by a screw 43 which is received through a mounting bore 27b provided at the front end portion of the carrier 27 so that the first head support 18 is prevented from pivoting with respect to the carrier 27. The carrier 27 is provided with a through-hole 27c for receiving the guide member 26.

The first head support 18 is integrally formed with a pivot 18c which abuts against the central portion of the gimbals 19. The second head support 21 is also integrally formed with a pivot 21e which abuts against the central portion of the gimbals 22. The second head support 21 is formed with a cylindrical portion 21f on which is mounted the lower end of the coiled spring 31a of the spring device 31, and an opening 21g for receiving the terminal plate 35. The mounting member 31b of the spring device 31 is formed with a cylindrical portion 31d on which is mounted the upper end of the coiled spring 31a of the spring device 31.

The chassis 1 is provided with a recess 1d for receiving the lower end portion of the carrier 27. The size of the recess 1d is set such that the carrier 27 moving on the guide member 26 does not collide with any edge portion of the recess 1d.

A printed circuit board (not shown) is disposed on the reverse surface of the chassis 1, with the chassis 1 being provided with bores 1e and 1f for allowing connection between the electrical members on the chassis 1 and electrical parts mounted on the printed circuit board. The bore 1e is employed for receiving a connector for the head cords 37 and 38, while the bore 1f is employed to connect terminals pins 32a of the position sensor 32 to corresponding electrical parts on the printed circuit boared.

The eject lever 9 is provided at a rear end thereof with an automatic ejection mechanism 44. The holder 6 is provided with leaf springs 45 and 45a for guiding the cartridge 5 and leaf springs 46 and 46a which abut against the cartridge 5 when it is set inside the holder 6 so as to press the cartridge 5 in a predetermined direction.

A sheet steel cover 47 is provided above the holder 6. A projection 1g for positioning the cover 47 is provided on the chassis 1, and the cover 47 is provided in a central portion thereof with a deformation preventing pin 48 which includes, for example, a screw or other similar means. Should the cover 47 become slightly warped as the result of application of a strong force, the deformation preventing pin 48 abuts against the holder 6, thereby preventing permanent deformation of the cover 47. Further, the mounting plate 28c of the driving device 28 is so formed so as to have an upper end contacting the inner face of the cover 47 for preventing the deformation thereof.

The holder 6 is provided with an opening 6a for receiving the second head support 21, relief bores 6b for preventing any rise in temperature of the magnetic disk 4, and an actuating member 6c which actuates the arm 33. A bent rib 6d is formed along the edge of the opening 6a. The bent rib 6d increases the strength of the holder 6 and offers electric and magnetic shielding effects for the second magnetic head 20.

A shutter 49 is provided in the opening 3a of the front panel 3. When no cartridge 5 is loaded in the holder 6, the shutter 49 is closed so as to prevent intrusion of dust into the holder 6 or other portions from the opening 3a.

The second head support 21 is provided with a notch 21h for positioning the arm 33. A relief recess 1h and a relief bore 1i are formed in the portion of the chassis 1 where the motors 28a is mounted. The arm 33 is integrally formed with a pin 33a. A cord retainer for the head cord 38 is formed by making use of the pin 33a and the arm 33.

In the above-described arrangement, the arm 33 is normally raised by the actuating member 6c of the holder 6 and, consequently, the second head support 21 is swung upwardly, whereby collision between the first and second magnetic heads 17, 20 is prevented.

When the cartridge 5 is inserted into the holder 6 from the opening 3a of the front panel 3 until the rear end portion of the cartridge 5 abuts against the lever 11a, the engagement between the lever 11a and the eject lever 9 is released, and the eject lever 9 is moved forwardly by the action of the coiled spring 10. Consequently, the holder 6 as a whole is lowered by the cooperation between the guide grooves 9c and the corresponding rollers 8.

When the holder 6 is lowered, the hub 4a of the magnetic disk 4 is mounted on the hub holder 16, and the first and second magnetic heads 17, 20 are allowed to abut against the corresponding sides of the magnetic disk 4. Under this state, the motor 28a is actuated such as to rotate the lead screw 28b. Thereupon, the screw nut 28d held by the coupling member 23 moves on the lead screw 28b, causing the coupling member 23, the first head support 18, the carrier 27 and the second head support 21 to move along the guide member 26.

According to this embodiment, the first head support 28 and the coupling member 23 are made of a metal, and the coupling member 23 is directly connected to the lead screw 28b. For this reason, the first head support 18 involves substantially no expansion and contraction as the result of fluctuations in temperature and relative humidity nor deformation with time and therefore suffers extremely small displacement with environmental change after the production thereof. Accordingly, it is possible for the first head support 18 to maintain its initial operation performance.

Further, the carrier 27 formed with the through-hole 27c for receiving the guide member 26 is constituted by a molded product of a synthetic resin and it is therefore possible to carry out mass-production.

Since the second head support 21 is also made of a metal, the second head support 21 is hardly expanded or contracted at all as the result of fluctuations in termperature and relative humidity, nor is it deformed with time. Consequently, the second head support 21 is subjected to extremely small displacement with environmental change after the production thereof and is able to maintain an initial operation performance in a manner similar to that of the first head support 18.

Moreover, since the first and second head supports 18, 21 are both made of a metal, they offer electric and magnetic shielding effects with respect to the first and second magnetic heads 17, 20. It is possible for a shielding member for the first and second magnetic heads 17, 20 to be integrally provided with the first or second head support 18 or 21, and there is no need to provide a shielding member as a separate member. It is therefore possible to greatly increase the degree of design freedom.

Furthermore, the first and second head support 18, 21 and the gimbals 19, 22 are respectively welded together. Therefore, in the service environment (a temperature range between 5° and 45°; a humidity range between 30% and 80%), the first and second head supports 18, 21 thus welded display small displacement as the result of environmental change and therefore are able to maintain their initial operation performances.

According to this embodiment, the metallic spacers or bushings 30 are respectively provided in the through-holes 27a of the carrier 27 by insert molding or press fitting in order to prevent any displacement between the first and second magnetic heads 17, 20 which would be caused by the reduction in the tightening force of the screws 29 as the result of the compressive deformation of the carrier 27 which may occur when the first head support 18, the synthetic resin carrier 27 and the second head support 21 are fastened together by the screws 29. Accordingly, even if the carrier 27 is made of a synthetic resin, it is possible for the first and second magnetic heads 17, 20 to be aligned with each other with high accuracy.

Although in this embodiment each of the first and second head supports 18, 21 is formed by blanking a thin steel sheet, the first and second head supports 18, 21 possess sufficiently high rigidity since they are respectively provided with the bent pieces 18and 21c. There is therefore no fear of the first and second head supports 18, 21 becoming curved in normal service conditions. Moreover, since the bent pieces 18a and 21c are formed so as to project from the respective surfaces of the first and second head supports 18, 21 which are opposite to the surfaces on which the first and second magnetic heads 17, 20 are mounted, it is possible to set a small gap between the first and second head supports 18, 21, thereby permitting a reduction in the thickness of the apparatus as a whole.

Additionally, in this embodiment the mounting position of the arm 33 and the pressing position of the coiled spring 31a of the spring device 31 are located in a substantially straight line extending in a direction orthogonal to the longitudinal direction of the second head support 21. For this reason, when the second head support 21 is swung upwardly, there is no possibility of the second head support 21 being curved and permanently deformed. It is therefore possible to prevent any displacement between the first and second magnetic heads 17, 20.

As has been described above, the magnetic head positioning apparatus according to the present invention includes the chassis, the driving device provided on the chassis, the guide member provided on the chassis, the carrier movably provided on the guide member, the first metallic head support mounted on the carrier and adapted to support the first magnetic head, the second metallic head support mounted on the carrier and adapted to support the second magnetic head which is disposed such as to oppose the first magnetic head, and the coupling member formed on the first head support as well as directly connected to the driving device, the coupling member being moved by the driving device in such a manner as to move the carrier along the guide member through the first head support. It is therefore possible to obtain a magnetic head positioning apparatus exhibiting excellent resistance to environmental changes and a capability of highly accurate positioning of the magnetic heads with high accuracy.

Although the invention has been described through specific terms, it is to be noted here that the described embodiment is not exclusive and various changes and modifications may be imparted thereto without departing from the scope of the invention which is limited solely by the appended claims.

What is claimed is:

1. A magnetic head position apparatus for a magnetic disk comprising:
   a magnetic head;
   a head support at which said magnetic head is mounted, said head support extending in a radial direction of the magnetic disk;
   means for carrying said head support;
   a guide member at which said carrying means is movably mounted;
   a chassis at which said guide member is mounted; and
   driving means mounted on said chassis, wherein said head support is made of metal, said carrying means is made separately from said head support, and said driving means is coupled to said head support so as to move said magnetic head through driving of said head support by said driving means while making said carrying means follow therewith along said guide member, whereby said magnetic head is accurately positioned without direct influence of said carrying means in a direction of movement of said magnetic head.

2. An apparatus according to claim 1, wherein said carrying means is made of synthetic resin.

3. An apparatus according to claim 1, wherein said head support is formed from sheet metal.

4. An apparatus according to claim 1, further comprising a metal coupling member provided on said head support, and said driving means and said head support being coupled through said coupling member.

5. An apparatus according to claim 4, wherein said driving means comprises a motor and a lead screw adapted to be rotated by said motor, and said lead screw and said coupling member are connected to each other.

6. A magnetic head positioning apparatus for a magnetic disk comprising:
   first and second magnetic heads;
   first and second head supports at which said first and second magnetic heads are respectively mounted, said supports extending in a radial direction of the magnetic disk;
   means for carrying said first and second head supports;
   a guide member at which said carrying means is movably mounted;
   a chassis on which said guide member is mounted to extend along a radial direction of the magnetic disk; and
   driving means mounted at said chassis, wherein said first and second head supports are made of metal, said carrying means is made separately from said head supports, and said driving means is coupled to one of said head supports so as to move said magnetic heads through driving said first and second head supports while making said carrying means follow therewith along said guide member, whereby said magnetic heads are accurately positioned without direct influence of said carrying means in a direction of movement of said magnetic heads.

7. An apparatus according to claim 6, wherein said carrying means is made of synthetic resin.

8. An apparatus according to claim 6, wherein said first and second head supports are formed from sheet metal.

9. An apparatus according to claim 6, further comprising a coupling member of metal provided on said one of said head supports, said driving means and said one of said head supports being coupled through said coupling member.

10. An apparatus according to claim 6, wherein said driving means comprises a motor and a lead screw adapted to be rotated by said motor, and said lead screw and said coupling member are connected to each other.

11. An apparatus according to claim 6, wherein the other of said head supports to which said driving device is not coupled is swingable with respect to said carrying means.

12. A magnetic head positioning apparatus for a magnetic disk comprising:

a chassis;

driving means provided at said chassis;

a rod-like guide member provided on said chassis and extending along a radial direction of the magnetic disk;

a carrier movably provided at said guide member;

a first head support mounted at said carrier and extending in the radial direction of the magnetic disk;

a first magnetic head mounted through a metal gimbal plate at one end of said first head support;

a second head support adapted to move along with said first head support and extending in a radial direction of the magnetic disk; and a second magnetic head mounted through a metal gimbal plate on one end of said second head support in opposition to said first magnetic head with said magnetic disk therebetween, wherein said first and second head supports are made of sheet metal, said carrier is made of synthetic resin, and said driving means is coupled to said first head support so as to move said magnetic heads through driving by said driving means while making said carrier follow therewith along said guide member, whereby said magnetic heads are accurately positioned without direct influence of said carrier in a direction of movement of said magnetic heads.

13. An apparatus according to claim 12, wherein said first and second head supports have bent portions for increasing rigidity thereof.

14. An apparatus according to claim 12, wherein said first and second head supports have bent pieces formed at two longitudinal end portions thereof, said bent pieces extending outwardly from a surface of said first head support which is opposite to other surface thereof at which said first magnetic head is mounted, and said second head support has bent pieces formed at two longitudinal end portions thereof, said bent pieces extending outwardly from a surface of said second head support which is opposite to the other surface at which said second magnetic head is mounted.

15. An apparatus according to claim 12, wherein said first and second head supports and said carrier are united to one another with said carrier interposed between said first and second head supports by fastening means, said carrier being provided with at least one through-hole for receiving said fastening means, said through-hole being provided with metallic spacer means inserted thereinto by one of insert molding and press fitting.

16. An apparatus according to claim 12, wherein said second head support includes a terminal plate for effecting electrical connection of a flexible cord connected to said second magnetic head, said terminal plate being integrally formed with arm means for swinging said second head support upwardly.

17. An apparatus according to claim 16, further comprising a spring means provided on said second head support for pressing said second head support in a direction such that said second magnetic head is pressed against said first magnetic head, with a pressing position of said spring means and a mounting position of said arm means being located in a substantially straight line extending in a direction orthogonal to a longitudinal direction of said second head support.

* * * * *